No. 617,849. Patented Jan. 17, 1899.
F. BOES.
APPARATUS FOR PRODUCING CRYSTAL ICE.
(Application filed June 18, 1898.)
(No Model.)
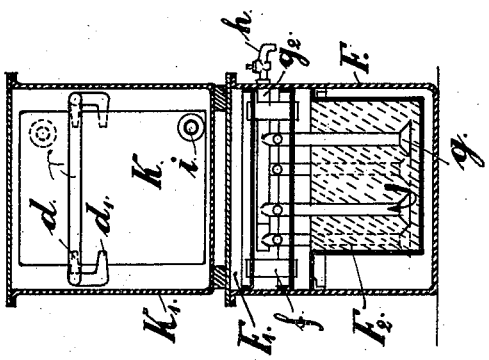
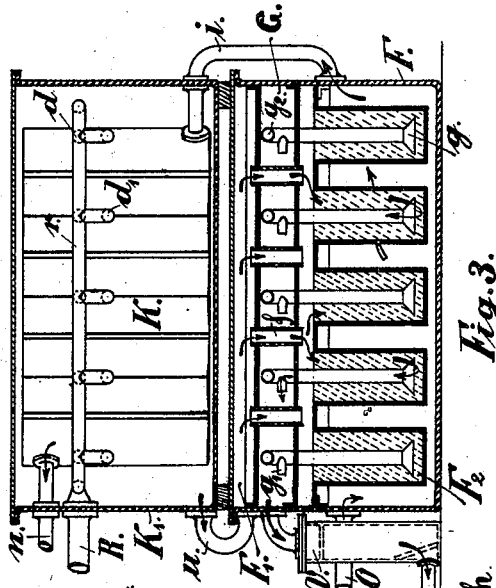
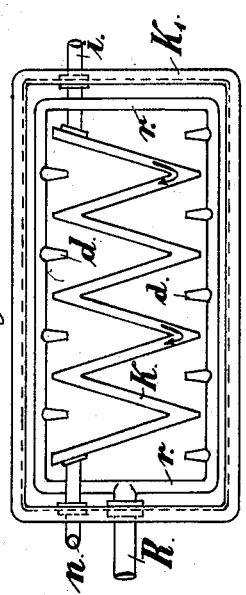
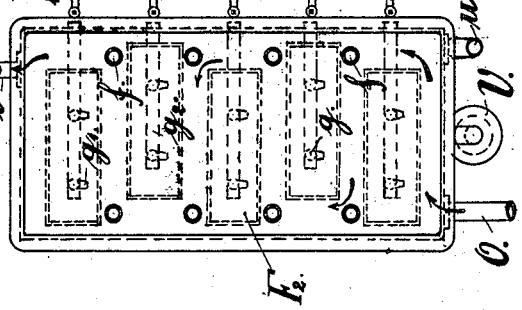
WITNESSES
INVENTOR

UNITED STATES PATENT OFFICE.

FRANZ BOES, OF DUSSELDORF, GERMANY.

APPARATUS FOR PRODUCING CRYSTAL ICE.

SPECIFICATION forming part of Letters Patent No. 617,849, dated January 17, 1899.

Application filed June 18, 1898. Serial No. 683,891. (No model.)

*To all whom it may concern:*

Be it known that I, FRANZ BOES, a subject of the King of Prussia, Emperor of Germany, residing at Dusseldorf, Kingdom of Prussia, Empire of Germany, have invented a certain new and useful Apparatus for the Production of Crystal Ice, of which the following is a specification.

The present invention relates to an apparatus for the production of crystal ice out of the waste steam leaving the steam-engine.

Figure 1 of the accompanying drawings is a longitudinal section of the apparatus with its parts. Fig. 2 is a cross-section of the same. Fig. 3 is the plan of the condensation-room from which the cover-plate is removed. Fig. 4 is the plan of the filter-room with the cover-plate removed.

The steam to be used comes from the steam-engine and passes through tube R into a piping $r\,r$, which is provided with outlet-nozzles $d\,d'$, arranged at suitable distances. Through these outlets the steam is driven between the angular walls of the cooling vessel K, where it condenses. The action of the nozzles into the angles is especially advantageous, because it produces a rebounding movement of the quantity of steam introduced and filling the space. In consequence of this arrangement of the cooling surfaces, which enables the utilization of the whole surfaces, a great saving of room is obtained. The water deposited from the steam collects in the lower part of the box K', surrounding the cooling-surfaces K, and passes through pipe $u$ into the upper distribution-chamber F' of the filter-box F. From here it flows through the communicating pipes $f$ over the filters $F^2$, passes through the same, rises in the pipes $g$, of which the lower end is of conical shape, and streams through the lateral openings $g'$ into the collecting-room G, from where it passes through a filter of any suitable construction V into the proper ice-cells. Besides, the filter rising-pipes $g$ are provided with traversing cylinder-pipes $g^2$ above the outlets $g'$, leading outside and provided with tap $h$. Any particles of oil which may have got into the filter from the rising-pipes $g$ enter into these pipes $g^2$. There they collect and can be let off through the tap $h$. This arrangement also enables a convenient control of the apparatus.

Another important improvement is the cooling of the filter, which is effected by the cooling-water let in through O and adapted to be run around the filter-chambers $F^2$, principally in serpentine windings. The action of the filter is thus rendered much better.

The filter-chambers $F^2$ are not brought up closely to each other and to the walls of the box F, but there is some space left between their walls as well as at the bottom, so that all surfaces of the filter-chambers are cooled. From there the cooling-water ascends through pipe $i$ into the angular cooling vessel K, streams through the same, and leaves the apparatus through pipe $n$.

The arrangement of the collecting-room G between the distributing-room F' and the filter-chambers $F^2$ is new and of favorable effect upon the function of the apparatus, inasmuch as through the cooling of the walls in upward and downward direction and through the communicating pipe $f$ the cooled water itself effects a previous cooling of the water streaming to the filtering material

Having now described my invention, what I claim as new, and desire to secure by Letters Patent, is—

An apparatus for the production of crystal ice consisting of a condenser with closed box K', inside with angular cooling vessel K, water-inlet pipe $i$, water-outlet pipe, steam-inlet R, annular distributing-pipe $r$ with nozzles $d\,d'$ opposite the angles of the said cooling vessel K, and a filtering apparatus with alternate, cooled filter-chambers $F^2$, the distributing-room F' feeding the chambers $F^2$, with supply-pipes $f$ passing through the collecting-room G, rising-pipes $g$ out of the filter-chamber $F^2$, with outlets $g'$ situated inside the collecting-room, connecting-pipe $g^2$ arranged above the latter $g'$ with tap $h$ situated outside, and an after filter V with filtering material arranged between sieves, substantially as described.

In witness whereof I have hereunto set my hand in presence of two witnesses.

FRANZ BOES.

Witnesses:
WM. ESSENWEIN,
JOH BECKER.